United States Patent [19]

Krueger

[11] 4,042,740
[45] Aug. 16, 1977

[54] REINFORCED PILLOWED MICROFIBER WEBS

[75] Inventor: Dennis L. Krueger, Hudson, Wis.

[73] Assignee: Minnesota Mining and Manufacturing Company, St.Paul, Minn.

[21] Appl. No.: 507,878

[22] Filed: Sept. 20, 1974

[51] Int. Cl.² .............................................. B32B 3/10
[52] U.S. Cl. ................................... 428/138; 156/624; 156/181; 156/244; 264/8; 264/176 F; 264/210 F; 264/DIG. 75; 428/178; 428/180; 428/255; 428/296; 428/401; 428/403
[58] Field of Search .............. 161/124, 170, 156, 169, 161/148, 68, 109; 156/62.2, 62.4, 181, 244; 117/16, 21; 264/DIG. 75, 210 F, 176 F, 8; 428/171, 401, 403, 288, 296, 138, 236; 255, 256, 285, 286, 287, 233, 174, 175, 180, 182, 183, 186, 137, 138, 139, 140

[56] References Cited

U.S. PATENT DOCUMENTS

| | | | |
|---|---|---|---|
| 1,316,010 | 9/1919 | Foches | 428/292 |
| 2,152,901 | 4/1939 | Manning | 264/DIG. 75 |
| 2,464,301 | 3/1949 | Francis Jr. | 161/123 |
| 2,493,968 | 1/1950 | Hepner | 161/124 |
| 3,016,599 | 1/1962 | Perry Jr. | 161/169 |
| 3,266,969 | 8/1966 | Makansi | 428/92 |
| 3,280,229 | 10/1966 | Simone | 161/109 |
| 3,428,518 | 2/1969 | Schafer | 161/170 |
| 3,681,183 | 8/1972 | Kalmutes | 161/169 |
| 3,682,756 | 8/1972 | Kalmutes | 161/169 |
| 3,704,198 | 11/1972 | Prentice | 161/170 |
| 3,753,844 | 8/1973 | Braun | 161/150 |
| 3,819,469 | 6/1974 | Parsons | 428/174 |
| 3,841,953 | 10/1974 | Lohkamp et al. | 428/296 |
| 3,849,241 | 11/1974 | Butra et al. | 428/137 |
| 3,905,863 | 9/1975 | Agers | 162/117 |
| 3,994,771 | 11/1976 | Morgan Jr. et al. | 428/178 |

Primary Examiner—Marion E. McCamish
Assistant Examiner—Stanley S. Silverman
Attorney, Agent, or Firm—Cruzan Alexander; Donald M. Sell; Roger R. Tamte

[57] ABSTRACT

Webs of blown microfibers having a network of compacted high-density regions and pillowed low-density regions are reinforced by a mesh of filaments used to collect the web.

16 Claims, 4 Drawing Figures

REINFORCED PILLOWED MICROFIBER WEBS

BACKGROUND OF THE INVENTION

Blown microfiber webs having a novel pillowed structure, and a novel method for making such webs, are described in a U.S. patent application of Humlicek, Ser. No. 507879, filed Sept. 20, 1974 (the same day as the present application). Conventionally, "blown microfibers" — which are discrete, very fine, discontinuous fibers prepared by extruding liquified fiber-forming material through fine orifices in a die into a high-velocity gaseous stream, where the extruded material is first attenuated and then solidifies as a mass of the fibers — are collected on a small-mesh collection screen that is moved transversely through the gaseous stream. A flat, or constant-thickness, coherent web is produced that is most often used in its collected form after being cut to useful sizes.

Humlicek discovered a radically different pillowed structure that can be made by making special use of perforations in the collection screen. He found that microfibers could be blown at the screen so as to cause them to penetrate into the perforations, while still closing and continuously bridging over the openings. At the land areas of the collection screen, the microfibers become compacted; but at the openings, low-density pillows of microfibers are formed.

The resulting microfiber web has a number of important advantages. For example, the pillowed low-density regions may be made with such a low density that the overall density of the web is lower than the density of previous blown-microfiber webs of comparable tensile strength. At the same time, the internal volume and the exterior surface area of the web are increased. These features are of special significance for use of the web in sorption, filtering, insulation, and like purposes.

However, the novel pillowed blown-microfiber webs still have a recognized disadvantage of blown microfiber webs. Because the webs consist of discontinuous fibers, and because blown microfibers do not generally have the strength of some synthetic fibers, the web has less tensile strength than is desired for many purposes. For example, one major use of microfiber webs is to sorb oil spills from bodies of water, and the higher the tensile strength, the greater the handleability of the web. Further, it is often desired to expel collected oil from an oil sorbent web and reuse the web, which subjects the web to further destructive stresses. Improvement in the tensile strength and integrity of blown microfiber webs would increase their utility in oil sorption, and would in general make possible a fuller realization of the potential of such webs.

SUMMARY OF THE INVENTION

The present invention provides novel reinforced pillowed blown-microfiber webs of increased strength and integrity by a unique procedure, which involves replacement of the perforated collection screen used by Humlicek with a mesh of filaments. For example, while Humlicek uses, in one embodiment, a metal honeycombed collection screen in which the land areas consist of the edges of walls that divide the honeycomb cells, I have found that such a screen can be replaced by a mesh of filaments, which have only a fraction of the depth of the honeycombed screen. The microfibers are collected by the mesh, with some of the fibers penetrating into the open areas of the mesh to form low-density pillows, and others of the microfibers becoming compacted upon the filaments of the mesh. But whereas a web prepared by Humlicek's procedure is removed from the collection screen, the mesh of filaments will become a lasting part of the web.

A pillowed microfiber web of the invention as prepared by my new procedure comprises, briefly, 1) a mesh of filaments, and 2) a coherent web comprising blown microfibers arranged as a) a network of compacted high-density regions that is in registration and engagement with said mesh of filaments, and b) pillowed low-density regions that span the space between adjacent compacted regions and are expanded and displaced out of the plane of the compacted regions in an arched configuration.

DETAILED DESCRIPTION

Figure 1:
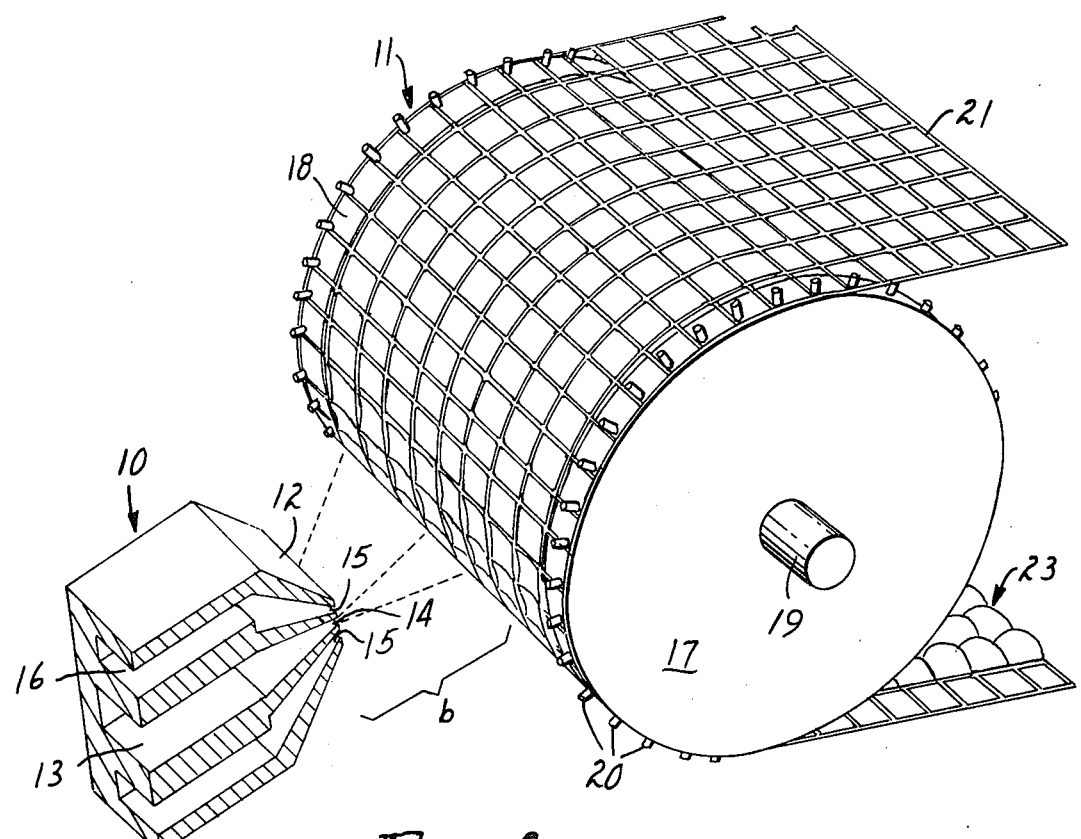
FIG. 1 is a perspective schematic view, partially in section, of apparatus used to make a microfiber web of the invention.

Illustrative apparatus for making a polymeric microfiber web of the invention is shown in FIG. 1 and includes microfiber-blowing apparatus 10 and collection apparatus 11. The microfiber-blowing apparatus, which can be conventional apparatus such as described in the literature, includes a die 12 having an extrusion chamber 13 into which liquified polymeric material is introduced, an orifice or set of orifices 14 arranged in line across the forward end of the die; and orifices 15 for supplying a stream of gas toward the polymeric material extruded from the orifices 14. The gas, which is normally air, is supplied through supply conduits 16 in amounts sufficient to provide a high-velocity movement of air. The high-velocity gaseous stream draws out and attenuates the polymeric material extruded through the die orifices, whereupon the attenuated polymeric material solidifies as microfibers during travel to the collector mechanism 11.

In the illustrated apparatus, the collection apparatus 11 comprises two wheels 17 and 18 mounted for rotation about an axis 19 and having projecting fingers 20 around their periphery. A mesh 21 of filaments is tautly held on the two wheels by engagement of the fingers 20 with the filaments. The mesh is advanced by the wheels from a supply roll (not shown), and after collection of microfibers on the mesh, a completed web 23 is removed from the wheels, whereupon it can be drawn to a storage roll. A vacuum may be applied on the side of the mesh 21 opposite from the extrusion apparatus 10 so as to facilitate movement of the microfibers into the open areas of the mesh and to facilitate removal of the gas that carries the microfibers to the mesh.

Figure 2:
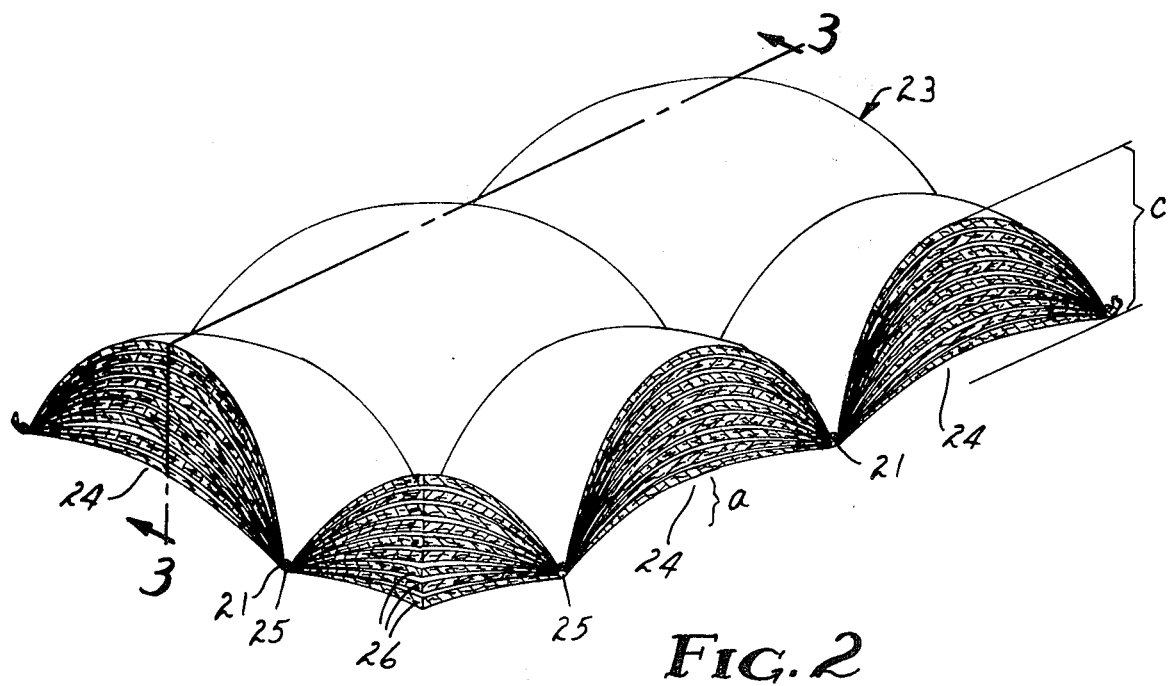
FIG. 2 is a perspective view, partially in section, of a portion of an illustrative microfiber web of the invention.
Figure 3:
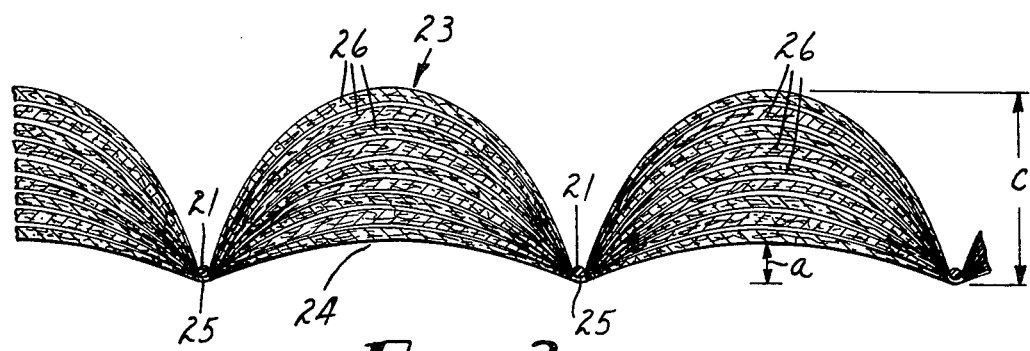
FIG. 3 is a section through the microfiber web of FIG. 2 taken along the line 3—3.

As shown in FIGS. 2 and 3 for the illustrative web of the invention 23, a portion of the collected microfibers penetrate into open areas of the mesh to form pillowed low-density regions 24. Another portion is collected on the filaments and forms compacted, high-density regions 25. Each pillowed low-density region 24 spans the space between adjacent compacted regions and is expanded and displaced above the level of the compacted regions (the distance $a$ in FIGS. 2 and 3) in an arched configuration. Additional layers of microfibers, such as constant-thickness layers, may be added to a web of the invention to cover up or fill in this displacement. At least in melt-blowing operations, the compacted regions often become fused to the filaments on which they are collected.

Often the microfibers in the pillows are collected in discrete spaced layers, as shown in FIG. 3 by the layers 26, which extend from one filament to the next-adjacent filament. Especially when using long collection distances the microfibers within the pillows may be given a more random orientation without such a layering. Within a layer, the microfibers are randomly intermingled and intertwined.

A web of the invention may include several thicknesses of microfibers collected by passing the mesh of filaments through more than one stream of extruded microfibers, or through the stream more than once. Also the rate of rotation of the wheels 17 and 18 may be varied to change the amount of microfibers in any area of the web (known as the basis weight of the web and defined as the weight of microfibers per unit area of the web). Several parameters of the microfiber-blowing procedure may be varied, typically in interrelated ways, to change the form and dimensions of the collected web. The following discussion describes some exemplary structures and ranges as guidelines for practicing the invention, but values outside the stated ranges may be selected when pillowed microfiber webs of the invention are prepared for certain uses.

One kind of variation is in the mesh of filaments. A wide range of filament diameters may be used; usually the filaments are between about 25 and 500 micrometers in diameter. The filaments need not be round, but may be flat and even tape-like. In some meshes, a portion of the filaments are so closely spaced that no pillows are formed between them. The mesh may be made by interweaving filaments, by cutting open areas in a unitary film, by expansion of a punched film, etc. The number of filaments may vary widely; often the filaments of the mesh occupy approximately 1 percent (i.e. 0.1 to 2 percent) of the whole area of the web, and generally they occupy less than about 60 percent of the whole area of the web. The open areas may be symmetrical or asymmetrical, so as to form elongated pillows, for example. The smaller the area occupied by the filaments, the smaller the openings may be, such as 250 micrometers, though they are usually 500 micrometers or more.

The filaments are most often a synthetic organic polymeric material. They may be monofilaments or strands of monofilaments. Other filaments, such as naturally occuring fibers or metal, glass, or ceramic filaments, may also be used.

The collection distance, that is, the distance between the die orifice and the mesh of filaments as carried on the support wheels 17 and 18 (the distance $b$ in FIG. 1), may be varied to control the depth of penetration by fibers into the open areas of the mesh and consequently the height of the pillows formed in the web. Generally the collection distance will be not less than about 2 centimeters, and preferably not less than about 4 centimeters, at least in a melt-blowing operation, so that the compacted areas collected on the lands of the reinforcing mesh will be fibrous rather than film-like, and therefore, more tear-resistant. As the opening size in the mesh is increased, the distance from the extrusion die to the mesh of filaments is also increased, to obtain the optimum low-density pillow. The ratio between the collection distance and the diameter of the opening usually ranges between 5 to 1 and 10 to 1 for optimum results.

It is usually impractical to use collection distances greater than about 30 centimeters, and preferably the collection distances are less than 15 centimeters, so as to provide a rather uniform distribution of fibers over the collection area. If the collection distance is too long for the particular reinforcing mesh being used, inadequate penetration is obtained, which in the extreme case results in webs of nearly constant thickness being formed. Formation of low-density pillowed areas has been observed at collection distances up to 75 centimeters when using 1-centimeter-diameter openings; but the pillows of such webs have not exhibited the spaced-layer nature which is preferred for certain purposes.

The velocity of the gas streams carrying the microfibers to the collector may also be varied, to control, for example the height of pillows formed in the web. Manifold pressures (pressure of gas prior to introduction to die) generally less than about 25 pounds per square inch gauge, (or 2 kilograms per square centimeter), and preferably less than about 15 pounds per square inch gauge (or 1 kilogram per square centimeter), may be used when the air-delivery orifice (the orifice 15 in FIG. 1) is a slot having a thickness of 0.3 millimeter to assure that the microfibers are not driven into the perforations of the carrier too forcefully. The front side of a web of the invention (that is, the top of the sample microfiber web of the invention shown in FIGS. 2 and 3) should have an unbroken surface (though open at interstices between fibers) for most uses of the web, and such a continuous surface is prevented by excessive velocity. Generally the air manifold pressure is more than about 4 pounds per square inch gauge (0.3 kilogram per square centimeter) and preferably more than about 6 pounds per square inch gauge (0.4 kilogram per square centimeter) when the air-delivery orifice has a width of 0.3 millimeter. The highest velocities can be used when the collection distance is large, and the specific velocity used is often chosen by varying the velocity and collection distance on a trial basis for a given collection screen.

Microfibers may be made from nearly any fiber-forming material that may be liquified, as by melting, or dissolving, to the viscosities used in microfiber-blowing operations. A preferred polymer for melt-blown microfibers is polypropelene, which is especially suited for use in oil-sorbing products. Other useful polymers for melt-blown microfibers include polyethylene, polyethylene terephthalate, nylons, and other polymers as known in the art. For solution-blown microfibers, polymers such as polyvinylchloride, polystyrene, and polyarylsulfones may be used. Inorganic materials also form useful blown microfibers.

The bulk of the microfibers collected in a melt-blowing operation usually have diameters between about 1 and 20 micrometers, though they may vary somewhat outside this range; and they may have lengths of 10 centimeters or more. The finer the fibers, and the lower the web density, the higher the capacity of the web to sorb oil. On the other hand, coarser fibers are not as delicate, are more abrasion resistant, and are capable of more stringent use. For special applications, for example, as reuseable oil sorbing units, a multilayer construction may be provided, comprising two coarse-fiber outer layers that protect an inner high-capacity fine-fiber core layer. Such a web is conveniently manufactured using a three-stage apparatus, with three separate dies arranged sequentially along a path on which a mesh of reinforcing filaments is moved. The mesh thus becomes an integral carrier for the collected web, and this use is especially adapted to solve manufacturing problems that arise because of the delicate nature of fine-fiber webs.

The density of the pillows formed varies depending on the height of the pillows, the collection distance, the velocity of the gaseous stream carrying the microfibers to the collector, the rate at which the collection screen is moved through the gaseous stream, and the ratio of gas to polymer passed through the extrusion apparatus. In addition, the basis weight of the web (that is, the weight of fibers per unit of area) can be varied by controlling such parameters and also by using a plurality of dies or a plurality of passes under one die so as to apply more than one layer of microfibers.

For certain uses of the microfiber web in which low-density high-volume pillows are needed, for example, when the web is to be used as a collector for fluids, the pillows have a density less than about 0.02 gram/cubic centimeter. For other uses, where the webs are to be used, for example, as filter media, thermal insulation, and acoustic barriers, the density of the pillow may be lower, such as about 0.004 gram/cubic centimeter. The density of the compacted regions can also be varied somewhat but generally is at least about 0.2 gram per cubic centimeter. The ratio of the densities of low-density and high-density regions in a web of the invention can be varied depending on the use that is to be made of the web. Generally that ratio is at least 20:1, and preferably 30:1, or more. Microfiber webs of the present invention are usually at least 5 millimeter thick, (the distance c in FIGS. 2 and 3), and for many uses are at least 1-3 centimeters thick. (It may be noted that calendered constant-thickness microfiber webs of the prior art generally have density ratios less than 10:1 and are generally only a fraction of a millimeter thick.) The overall density of a web of the invention (minus the mesh of filaments) is generally less than 0.05 gram/cubic centimeter, and for many uses is less than 0.02 gram per cubic centimeter. Particle-loaded pillowed microfiber webs may be made as shown in a copending patent application of Braun, Ser. No. 435,198, filed Jan. 21, 1974. As described in that application, particle-loaded webs may be made with apparatus comprising one or more dies such as the die 12 shown in FIG. 1 and a delivery conduit for particles. For example one die may be arranged on each side of the delivery conduit so that the streams of microfibers issuing from the dies intersect in front of the delivery conduit to form one stream of microfibers that continues to the collector. The stream of particles intercepts the two streams of microfibers at the latter's point of intersection.

The webs prepared are especially useful for presenting a three-dimensional arrangement of particles in which the particles can interact with (for example, chemically or physically react with, or physically contact or be modified by) a medium to which the particles are exposed. The particles are physically entrapped within the interstices of the web and no binder material is required to hold them in place for typical useful functions of the web. The result is that the particles are generally held in the web so that the full surface of the particles is exposed for interaction with a medium to which the product or web is exposed.

Any kind of solid particle that may be dispersed in an airstream ("solid" particle, as used herein, refers to particles in which at least an exterior shell is solid, as distinguished from liquid or gaseous) may be incorporated into a web of the invention. The particles may vary in size, at least from five micrometers to five millimeters in average diameter; most often they are between fifty micrometers and 2 millimeters in average diameter. Generally the ratio of the average diameter of the particles to the average diameter of the microfibers is at least 4 or 5 to 1 to provide good entrapment of the particles by the fibers, and preferably is at least 10 to 1.

Microfiber webs of the invention may be laminated to other sheet structures for certain purposes, such as to improve the strength of the web. Also the webs may be impregnated after formation for particular purposes. Or microfibers webs of the invention may be combined with one another for certain purposes.

As previously indicated, microfiber webs of the invention are superior in that they are capable of sorbing large amounts of liquid without breaking. This feature can be indicated with a performance factor, which is the multiplication product of strip tensile strength and oil sorbency ratio. Strip tensile strength is defined as the force needed to break a web (as in grams) divided by the width of the sample (as in meters), and then divided by the basis weight of the web. Oil sorbency ratio is determined by first measuring the weight of a sample, then using it to sorb oil to its maximum capacity, and then weighing the oil-filled sample. The difference between the dry weight and oil-filled weight of the sample, divided by the dry weight of the sample is a measure of oil sorbency. Oil sorbency ratio increases with decreasing weight of the sample, so that finer-fibered samples with greater void volume have greater oil sorbency. Oil sorbency ratio is thus a measure of density; the greater the oil sorbency ratio, the lower the density.

The invention will be further illustrated by the following examples.

EXAMPLES 1 AND 2

Figure 4:
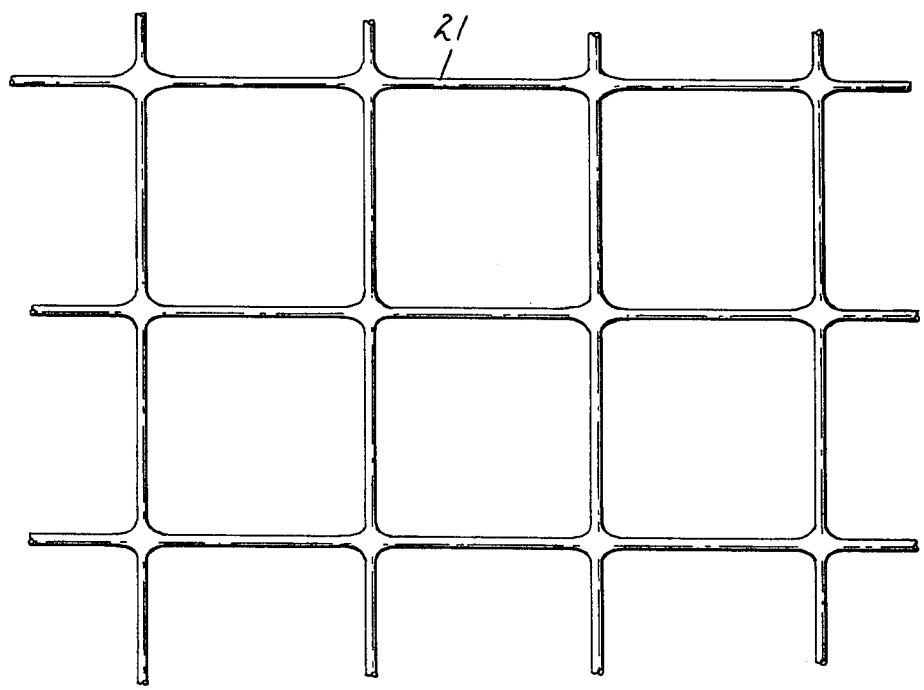
FIG. 4 is a top view of an illustrative mesh of filaments used in a microfiber web of the invention.

Two different reinforced microfiber webs of the invention were made by supporting two different meshes of reinforcing polypropylene filaments about 5 centimeters in front of an extrusion apparatus as illustrated in FIG. 1. The two different meshes which had square openings and were as illustrated in FIG. 4, used different densities of filaments. The first mesh included four filaments per 5 centimeters of length and width of the mesh, and the second mesh included six filaments per 5 centimeters of length and width (the meshes were made by Conwed and designated TD322 and TD323). Polypropylene microfibers were extruded through the apparatus and collected on the mesh using process conditions as follows:

| | |
|---|---|
| Temperature of molten polypropylene (having a melt flow of 12 grams/10 minutes) | 250° C |
| Temperature of die | 370° C |
| Temperature of air | 510° C |
| Rate of polymer flow (Using about 200 polymer extrusion orifices having a width of 0.3 millimeter) | 15.7 grams per minute |
| Air Pressure (The air orifice had a slot thickness of 0.3 millimeter) | 0.7 kilogram per |

| | square centimeter |
|---|---|
| Rate of movement of mesh | |
| First mesh (Example 1) | 7.9 centimeters per second |
| Second mesh (Example 2) | 4.6 centimeters per second |

A microfiber web was collected having a nominal thickness including the height of the pillows of 1.7 centimeters, with the microfibers having an average diameter of about 5 micrometers. Samples 5 centimeters by 10 centimeters were cut and evaluated for oil sorbency using heavy mineral oil (having a viscosity of 75–80 centistokes). The oil sorbency ratio was determined to be between 65 and 100 grams oil per gram of web.

Test samples were used to sorb oil, then squeezed to remove oil, and then used again to sorb oil several times. Data for the two samples are given in the following table.

TABLE I

| Ex. No. 1 Dry Wt. of Web (grams) | Saturated Web (grams) | Squeezed Wt. of Web (grams) | Percent Oil Removed | Oil Sorbency Ratio | No. of Use |
|---|---|---|---|---|---|
| 0.26 | 20.9 | 1.4 | | 79.4 | 1 |
| | 13.5 | 1.25 | 92.5 | 50.9 | 2 |
| | 10.8 | 1.2 | 91.1 | 40.5 | 3 |
| | 10.9 | 1.1 | 92.2 | 40.9 | 4 |
| | 10.8 | 1.1 | 92.1 | 40.5 | 5 |
| | 10.3 | 1.1 | 92.6 | 38.6 | 6 |
| Ex. No. 2 | | | | | |
| 0.295 | 23.5 | 2.0 | 92.7 | 78.7 | 1 |
| | 15.9 | 1.9 | 89.7 | 52.9 | 2 |
| | 14.1 | 2.2 | 86.2 | 46.8 | 3 |
| | 14.4 | 1.6 | 90.7 | 47.8 | 4 |
| | 13.5 | 1.6 | 90.1 | 44.8 | 5 |
| | 13.4 | 1.5 | 90.8 | 44.8 | 6 |

EXAMPLES 3–9

Polypropylene microfiber webs were prepared using a variety of meshes as listed in the table below, manually moved through a stream of microfibers. The conditions used were as follows.

| | |
|---|---|
| Polymer temperature | 371° C |
| Die temperature | 400° C |
| Air temperature | 400° C |
| Rate of polymer flow (Using about 200 0.3-millimeter-wide orifices) | Estimated 15 grams/minute |
| Air Pressure (Air orifice had a slot thickness of 0.3 millimeter) | 1.41 kg/cm$^2$ |

EXAMPLE 10

Example 1 was repeated using the same mesh and conditions except that the temperature of the molten polypropylene was 238° C, the temperature of the die was 357° C, the rate of polymer flow was 21.9 grams/minute, the air pressure was 0.84 kilogram per square centimeter, and the mesh was moved at a rate of about 8 centimeters per second. Two samples cut from the resulting web were found to have an average oil sorbency ratio of about 83 grams oil per gram of web and an average strip tensile strength of about 817 meters, giving a performance factor of 65,811. For comparison, a commercial flat web of polypropylene microfibers exhibits an oil sorbency ratio of about 21 grams oil per gram of web, a strip tensile strength of about 233 meters, and a performance factor of about 4900.

TABLE II

| Ex. No. | Kind of Mesh | Opening Size (centimeter) | Weight, Volume, and Density of Individual Pillow Without Mesh | | |
|---|---|---|---|---|---|
| | | | Weight (grams) | Volume (cubic centimeter) | Density (gm/cc) |
| 3 | Coarse polypropylene | 0.37 × 0.37 | .0019 | .082 | .023 |
| 4 | Hardware cloth (steel) | 0.635 × 0.635 | .0066 | .164 | .040 |
| 5 | Chicken wire | 2.87 (long dimension) | .1221 | 10.47 | .012 |
| 6 | Polyethylene | 0.70 × 0.86 | .0134 | .541 | .025 |
| 7 | Polyethylene | 1.90 × 2.03 | .0158 | 3.507 | .0045 |
| 8 | Nylon (circles) | 0.32 (diameter) | .0025 | .008 | .3125 |
| 9 | Heavy wire | 2.5 × 0.85 | .363 | 1.245 | .029 |

What is claimed is:

1. A low-density web comprising 1) a mesh of filaments and 2) a coherent mass of blown microfibers arranged into a network of compacted high-density regions and pillowed low-density regions, the compacted regions being in registration and engagement with the filaments of said mesh, and the pillowed regions spanning the space between adjacent compacted regions, with microfibers arching outwardly from their level in a compacted region into a pillowed region, whereby in a free-standing condition of the mass the pillowed regions are displaced to one side of a plane defined by the base of the compacted regions and have an expanded and arched configuration in which the span length from compacted region to compacted region of the most highly arched microfibers is greater than that of less highly arched microfibers.

2. A web of claim 1 that is at least 5 millimeters thick.

3. A web of claim 1 in which the ratio of the densities of the high-density and low-density regions is at least 20 to 1.

4. A web of claim 1 in which the microfibers are melt-blown microfibers.

5. A web of claim 1 in which the microfibers are solution-blown microfibers.

6. A web of claim 1 in which the pillowed low-density regions comprise spaced layers of microfibers that span the pillowed regions and are anchored at their edges to the compacted regions.

7. A web of claim 1 containing minute solid particles dispersed and physically entrapped within the interstices of the web.

8. A web of claim 1 in which the filaments comprise polymeric filaments.

9. A web of claim 1 in which at least portions of the compacted regions are fused to the mesh of filaments.

10. A web of claim 1 prepared by disposing the mesh in a stream of microfibers so that the pillowed low-density regions accumulate in the open areas of the mesh and the compacted regions form on the filaments of the mesh.

11. A low-density web at least 5 millimeters thick comprising 1) a mesh of polymeric filaments and 2) a coherent mass of blown polymeric microfibers arranged into the network of compacted high-density regions and pillowed low-density regions, the compacted regions being in registration and engagement with the filaments of said mesh, and the pillowed regions spanning the space between adjacent compacted regions, with microfibers arching outwardly from their level in a compacted region into a pillowed region, whereby in a free-standing condition of the mass the pillowed regions are displaced to one side of a plane defined by the base of the compacted regions and have an expanded and arched configuration in which the span length from compacted region to compacted region of the most highly arched microfibers is greater than that of less highly arched microfibers.

12. A web of claim 11 in which the ratio of the densities of the high-density and low-density regions is at least 20 to 1.

13. A web of claim 11 in which the microfibers comprise polypropylene microfibers.

14. A web of claim 11 in which said pillowed regions comprise spaced arched layers of microfibers that span the pillowed regions and are anchored at their edges to the compacted regions.

15. A web of claim 11 prepared by disposing the mesh in a stream of microfibers so that the pillowed low-density regions accumulate in the open areas of the mesh and the compacted regions form on the filaments of the mesh.

16. A web of claim 11 in which the microfibers and mesh comprise the same polymeric material.

* * * * *